Figure 1:
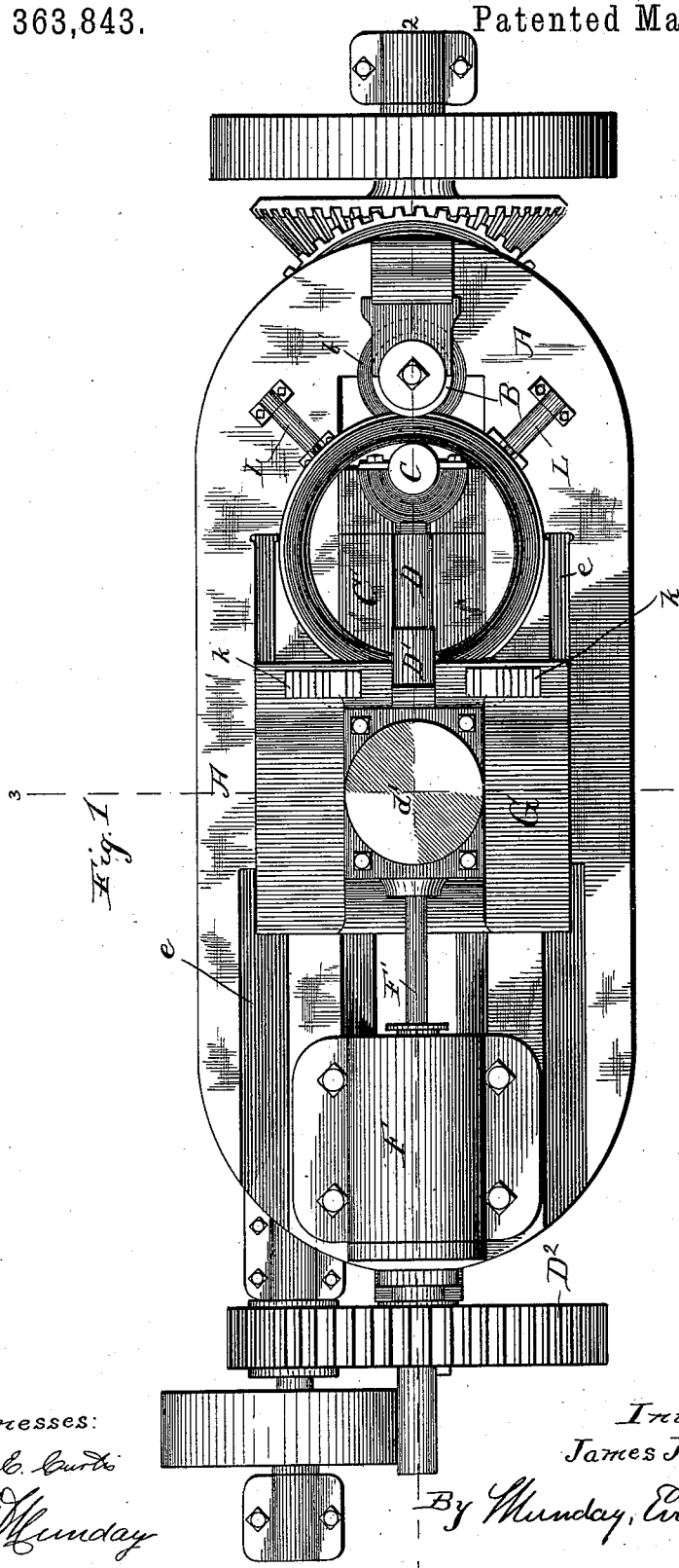

(No Model.) 3 Sheets—Sheet 1.

J. MUNTON.
MACHINE FOR ROLLING CAR WHEEL TIRES.

No. 363,843. Patented May 31, 1887.

Witnesses:
Lew. E. Curtis
H. W. Munday

Inventor:
James Munton,
By Munday, Evarts & Adcock.
his Attorneys:

(No Model.) 3 Sheets—Sheet 2.

J. MUNTON.
MACHINE FOR ROLLING CAR WHEEL TIRES.

No. 363,843. Patented May 31, 1887.

(No Model.) 3 Sheets—Sheet 3.

J. MUNTON.
MACHINE FOR ROLLING CAR WHEEL TIRES.

No. 363,843. Patented May 31, 1887.

Witnesses:
Lew. E. Curtis
H. M. Munday

Inventor:
James Munton
By Munday, Evarts & Adcock
his Attorneys

UNITED STATES PATENT OFFICE.

JAMES MUNTON, OF MAYWOOD, ILLINOIS.

MACHINE FOR ROLLING CAR-WHEEL TIRES.

SPECIFICATION forming part of Letters Patent No. 363,843, dated May 31, 1887.

Application filed February 1, 1887. Serial No. 226,118. (No model.)

*To all whom it may concern:*

Be it known that I, JAMES MUNTON, a citizen of the United States, residing in Maywood, in the county of Cook and State of Illinois, have invented a new and useful Improvement in Tire Rolling, Edging, and Densifying Machines, of which the following is a specification.

My invention relates to tire rolling machines.

It is the object of my invention to provide a tire-rolling machine whereby the tire may be rolled backward—that is, from a larger to a smaller diameter. The purpose of this is twofold, first, to densify and solidify the steel, and thus improve the character of the tire, which is particularly desirable in making tires from unhammered blooms cast with central openings; and, second, even where it is not desired to further densify the metal, it frequently happens in rolling tires that the tire is by accident or mistake rolled of too large a diameter to suit any order, and heretofore no use could be made of such tires, as their diameter can only be diminished to a very limited extent by the customary process of shrinking. I can by rolling the tires backward, however, by my invention diminish their diameter to any desired extent, and if the rolling backward increases the thickness of the tire too much the surplus metal may be removed in the usual way by turning.

To this end my invention consists in a tire-rolling machine having three or more exterior pressure-rolls to bear against the tread of the tire and mechanism for gradually forcing such rolls toward each other to contract the diameter of the tire, densify the metal, and increase the thickness of the tire as it is rolled. In the ordinary method of rolling tires but two pressure-rolls are employed—one upon the inside and one upon the outside of the tire, opposing each other, their operation being to diminish the thickness of the tire and increase its diameter, and in addition to these two pressure-rolls two or more exterior guide-rolls are employed to preserve the circular form of the tire. In my invention three exterior pressure-rolls are employed, and during the backward rolling or densifying process no interior pressure-roll is used, and if an interior pressure-roll should be added it would tend to defeat the operation of the machine and the result to be accomplished by it.

Another feature of my invention consists in a tire-rolling machine having the usual interior and exterior pressure-roll, and also the three exterior pressure-rolls, so that after the tire has been rolled by the former it may be rolled backward or diminished by the latter without removing the tire from the machine or reheating it. This is a matter of great convenience, as well as saving in rolling tires, even where no densifying is required, as if the tire should happen to be rolled too large in diameter it may be quickly brought back to the required diameter by the three exterior pressure-rolls without even removing the tire from the machine. In embodying this feature of my invention in working form or reducing it to practice I provide the bed of the machine with two movable slides, both of which may preferably be operated in the usual way by hydraulic cylinders, upon one of which I mount the interior pressure-roll and upon the other of which I mount two of the exterior pressure-rolls, the other exterior fixed and driven roll being used to co-operate both with the interior pressure-roll and also with the two movable exterior pressure-rolls.

Another feature of my invention consists in combining with the three exterior pressure-rolls a pair of edging or horizontal pressure-rolls, so that the tire may be simultaneously densified in both directions when desired. These edging-rolls may also co-operate with the interior and exterior pressure-roll when it is desired to edge the tire in or diminish its width at the same time it is being rolled outward or to increase its diameter.

Still another feature of my invention consists in combining with the interior pressure-roll the three exterior pressure-rolls and the two horizontal or edging pressure-rolls, so that the metal of the tire may be densified and rolled without changing the diameter or size of the tire when desired.

My invention further consists in the novel devices and novel combinations of parts or devices herein shown and described, and more particularly pointed out in the claims.

By my new machine it will be understood that the tire as it is being rolled may be kept completely under the control of the operator in relation to its size, shape, and densification by simply bringing the several sets of rolls into operation, one or all, and each to a greater or less extent, as may be required; and where, as is frequently the case, it is necessary to cut notches or cavities in the surface of the tire, in order to remove imperfections, such cavities may be completely rolled out and made to disappear, and then the tire rolled back to its proper diameter or size. I am thus enabled by my machine to make good tires out of blooms, where in many cases in the old way tires could not possibly be produced.

Figure 2:
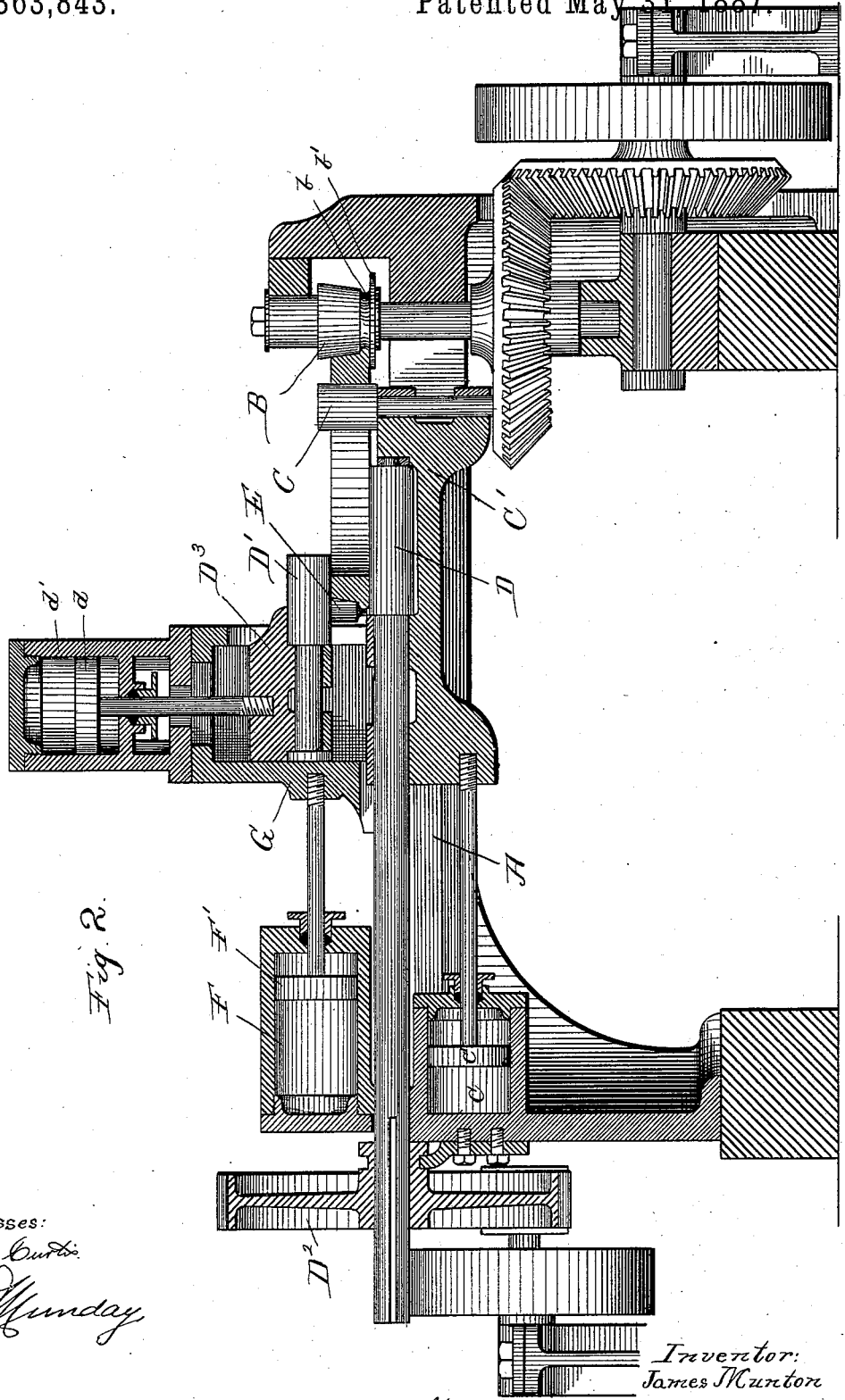
Figure 3:
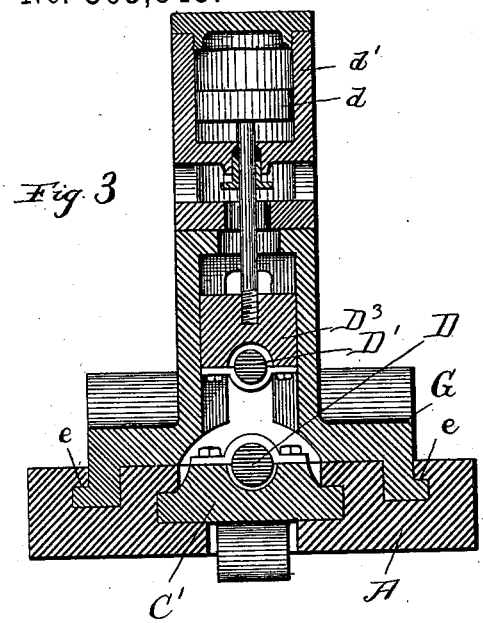
Figure 4:
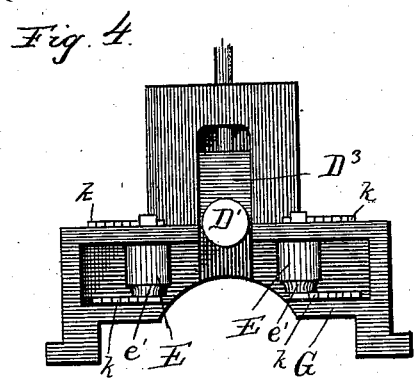
Figure 5:
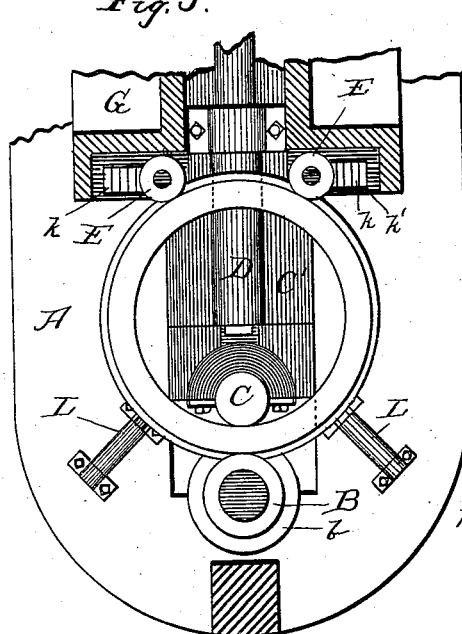
Figure 6:
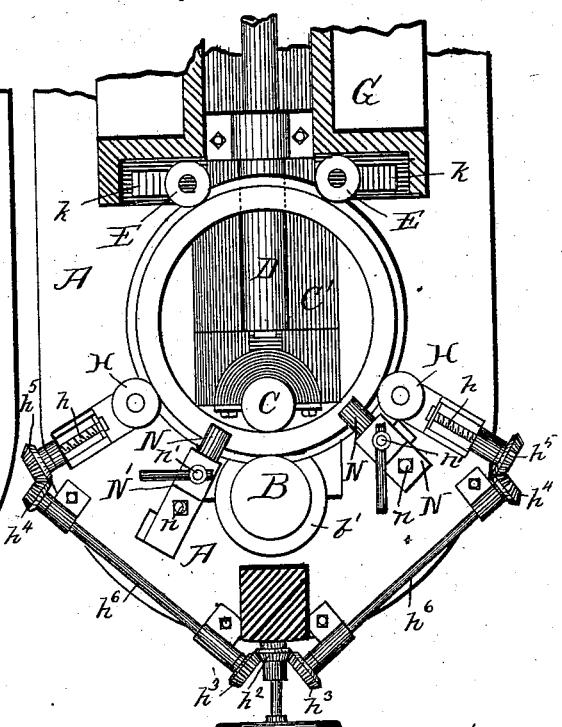

In the accompanying drawings, which form a part of this specification, and in which similar letters of reference indicate like parts, Figure 1 is a plan view of a machine embodying my invention. Fig. 2 is a central longitudinal section. Fig. 3 is a cross-section on line 3 3 of Fig. 1. Fig. 4 is a detail end view of the movable slide carrying the two exterior pressure-rolls. Fig. 5 is a detail plan view partly in horizontal section, and Fig. 6 is a similar view showing exterior guide-rolls added.

In said drawings, A represents the frame or bed of the machine.

B is the fixed exterior pressure-roll, which is driven in the usual way, and journaled in suitable bearings upon the frame of the machine. This roll B is provided with the usual annular groove, $b$, and flange $b'$ to form the flange of the tire.

C is the inner or movable pressure roll, journaled upon the movable slide $C'$, which reciprocates in suitable guides upon the frame of the machine. The slide $C'$ is or may be operated by a hydraulic cylinder and piston, $c\ c'$, to force the movable roll C against the opposing fixed roll B. The roll C is or should be a plain roll, and it bears against the interior surface of the tire.

The operation of the rolls B C is the customary one in tire-rolling machines, and serves to diminish the thickness of the tire and increase its diameter.

D and $D'$ are a pair of pressure-rolls arranged horizontally for edging in the tire or reducing its width. The roll D is the driven one, and it or its shaft is journaled in suitable bearings upon the reciprocating slide $C'$ at one end, and in similar bearings upon the frame or bed A at or near its other end.

The slide $C'$ needs to have but a comparatively slight reciprocating movement, just sufficient to reduce the thickness of the bloom as required for the tire, and the edging-roll D, mounted thereon, reciprocates with the slide and through its bearings on the frame A. To permit of this longitudinal movement of the roll D or its shaft, the driving-gear $D^2$, by which such roll is revolved, is keyed on said shaft to permit the shaft to slide through the gear. This is clearly indicated in Fig. 2. The upper or movable edging-roll, $D'$, is journaled in or upon a vertically-reciprocating slide, $D^3$, which is operated to press the rolls D $D'$ together by means of a hydraulic piston and cylinder, $d\ d'$.

E E are a pair of exterior movable pressure-rolls, suitably journaled upon a longitudinal slide, G, which is mounted in suitable guides, $e\ e$, upon the frame or bed-plate of the machine. The rolls E E are provided with peripheral grooves $e'\ e'$ for the flange of the tire. The slide G is operated to force the rolls E E against the tire in opposition to the roll B, by means of a hydraulic cylinder and piston, F $F'$. The slide $D^3$, which carries the movable edging-roll $D'$, is mounted to reciprocate vertically in suitable guides on this slide G. The piston and cylinder F $F'$ will thus serve to adjust the edging-roll $D'$ longitudinally as the tire or bloom changes its diameter in rolling.

The two movable exterior pressure-rolls E E, which, in conjunction with the exterior roll B, operate as densifying-rolls and to diminish the diameter of the tire and to increase its thickness, may be adjusted laterally to or from each other, as the diameter of the tire changes, by means of removable blocks or plates $k\ k$, fitting in a suitable groove or recess, $k'$, and against which the bearing-blocks of the rolls E E rest.

Instead of employing hydraulic cylinders and pistons for operating the several pressure-rolls, other suitable means or mechanisms may be employed, as is well-known to those skilled in the art—such, for example, as screws, worm-gears, and other devices. The roll D, I ordinarily drive by a separate engine or engines from that employed for driving the main roll B. However, the rolls may be driven in any suitable way.

H H are a pair of guide-rolls, which aid in preserving the circular form of the tire as it is rolled. These guide-rolls are mounted in adjustable bearings, and furnished with the usual adjusting-screws, $h\ h$, to accommodate them to the changing diameters of the tire as it is rolled. The adjusting-screws $h\ h$ are simultaneously operated from a hand-wheel, $h'$, through the bevel-gears $h^2\ h^3\ h^3\ h^4\ h^4\ h^5\ h^5$ and shafts $h^6\ h^6$.

To aid in keeping the tire flat upon the anti-friction rolls L L when the edging-in rolls D $D'$ are operated, I provide one or more horizontal guide-rolls, N, which are journaled upon swinging frames $N'$, pivoted at $n$ to the bed A, so that they may be swung out of the way when their use is not desired. These guide-rolls N are adjusted up and down in their frames in the usual way by screws $n'$.

I claim—

1. The combination, in a tire-rolling machine, of three exterior pressure-rolls adapted to bear against the tread or outer periphery of the tire and mechanism for forcing said rolls together to contract the diameter of the tire as it is rolled, substantially as specified.

2. The combination, in a tire-rolling machine, of three exterior pressure-rolls adapted to bear against the tread or outer periphery of the tire, and mechanism for forcing said rolls together to contract the diameter of the tire as it is rolled, and a pair of horizontal or edging pressure-rolls, substantially as specified.

3. The combination, in a tire-rolling machine, of exterior fixed pressure roll, B, inner movable pressure-roll, C, exterior movable pressure-rolls, E E, and horizontal or edging pressure-rolls D D', substantially as specified.

4. The combination, in a tire-rolling machine, of exterior fixed pressure-roll, B, inner movable pressure-roll, C, and exterior movable pressure-rolls, E E, said rolls B E E adapted to bear against the exterior surface of the tire, and said roll C against its interior surface, substantially as specified.

5. The combination, in a tire-rolling machine, of fixed exterior roll, B, movable slide G, exterior pressure-rolls, E E, mounted upon said slide, and a hydraulic cylinder and piston for operating said slide, substantially as specified.

6. The combination, in a tire-rolling machine, of fixed exterior roll, B, movable slide G, exterior pressure-rolls, E E, mounted upon said slide, horizontal fixed driven roll D, vertically-movable pressure-roll D', and vertically-movable slide $D^3$, substantially as specified.

7. The combination, in a tire-rolling machine, of fixed exterior roll, B, movable slide G, exterior pressure-rolls, E E, mounted upon said slide, horizontal fixed driven roll D, vertically-movable pressure-roll D', and vertically-movable slide $D^3$, said slide $D^3$ being mounted in suitable guides upon said slide G, substantially as specified.

8. The combination, in a tire-rolling machine, of fixed exterior roll, B, movable slide G, exterior pressure-rolls, E E, mounted upon said slide, horizontal fixed driven roll D, vertically-movable pressure-roll D', and vertically-movable slide $D^3$, a cylinder and piston for operating said slide G, and a cylinder and piston for operating said slide $D^3$, substantially as specified.

9. The combination, in a tire-rolling machine, of fixed exterior roll, B, movable slide G, exterior pressure-rolls, E E, mounted upon said slide, horizontal fixed driven roll D, vertically-movable pressure-roll D', and vertically-movable slide $D^3$, a cylinder and piston for operating said slide G, and a cylinder and piston for operating said slide $D^3$, and mechanism for revolving or driving said rolls B and D, substantially as specified.

10. The combination, in a tire-rolling machine, of fixed exterior roll, B, movable slide G, exterior pressure-rolls, E E, mounted upon said slide, horizontal fixed driven roll D, vertically-movable pressure-roll D', vertically-movable slide $D^3$, movable interior pressure-roll, C, and slide C', upon which said roll C is mounted, substantially as specified.

11. The combination, in a tire-rolling machine, of fixed exterior roll, B, movable slide G, exterior pressure-rolls, E E, mounted upon said slide, horizontal fixed driven roll D, vertically-movable pressure-roll D', and vertically-movable slide $D^3$, a cylinder and piston for operating said slide G, and a cylinder and piston for operating said slide $D^3$, mechanism for revolving or driving said rolls B and D, movable interior pressure-roll, C, slide C', and a cylinder and piston for operating said slide C', substantially as specified.

JAMES MUNTON.

Witnesses:
H. M. MUNDAY,
LEWIS E. CURTIS.